the speed of the tool carrying carriage and the spindle.

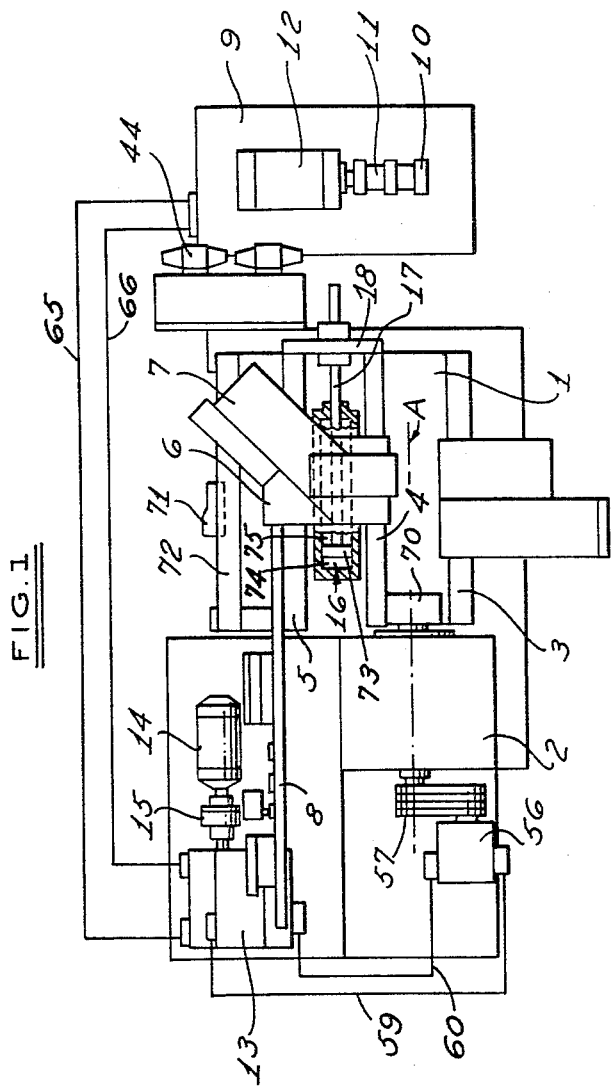

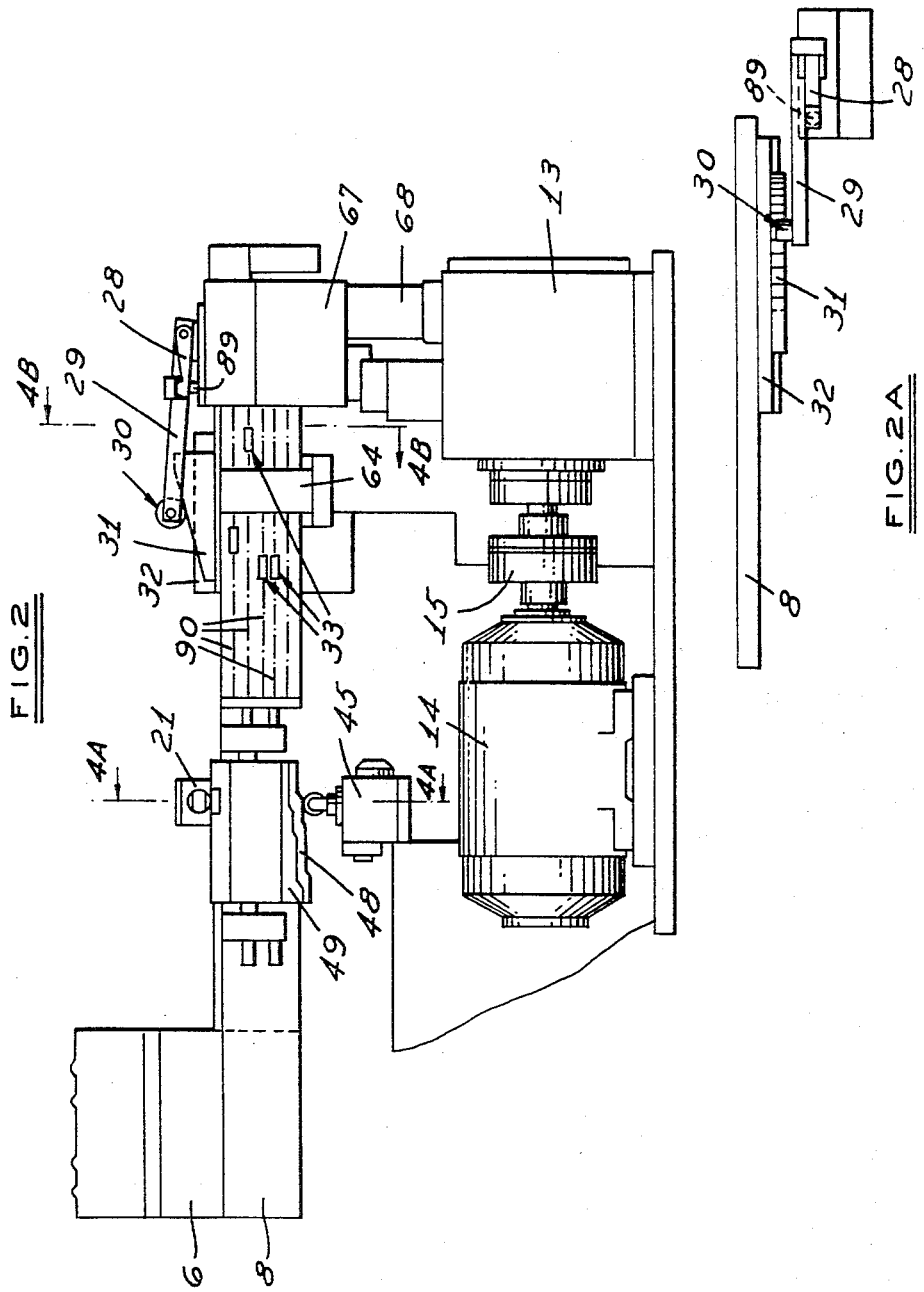

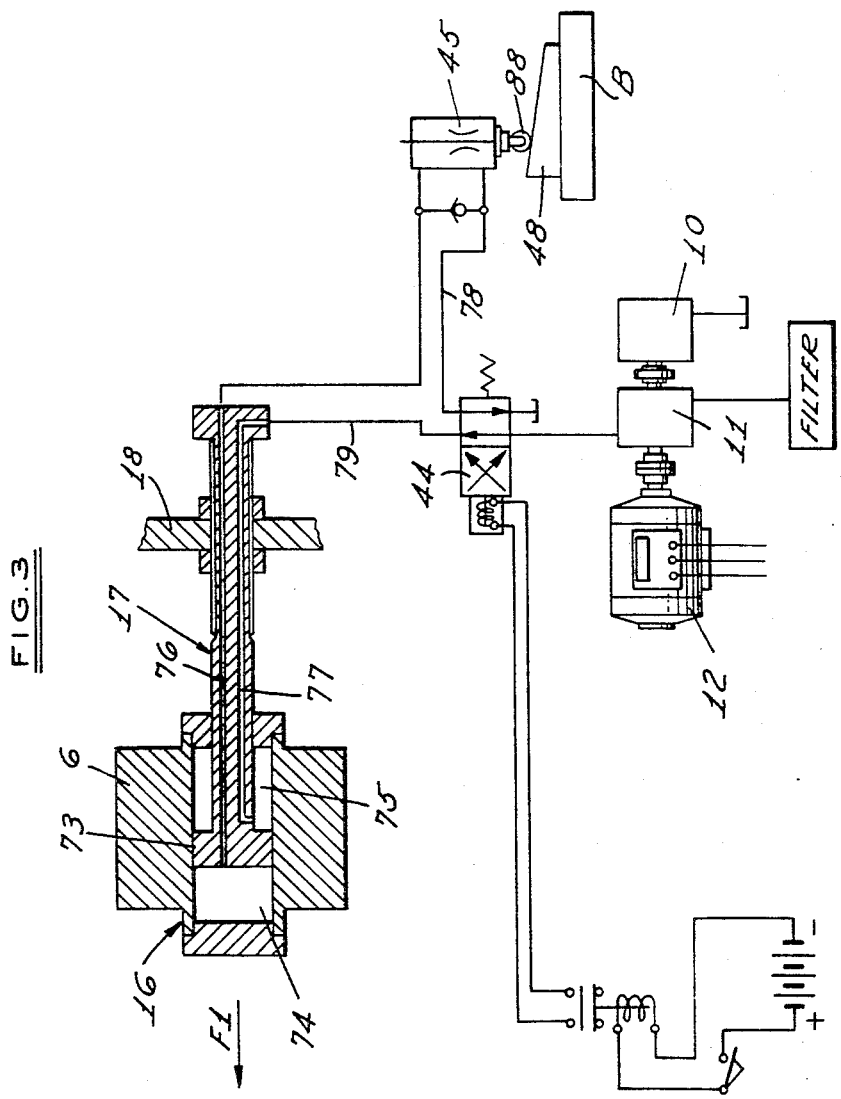

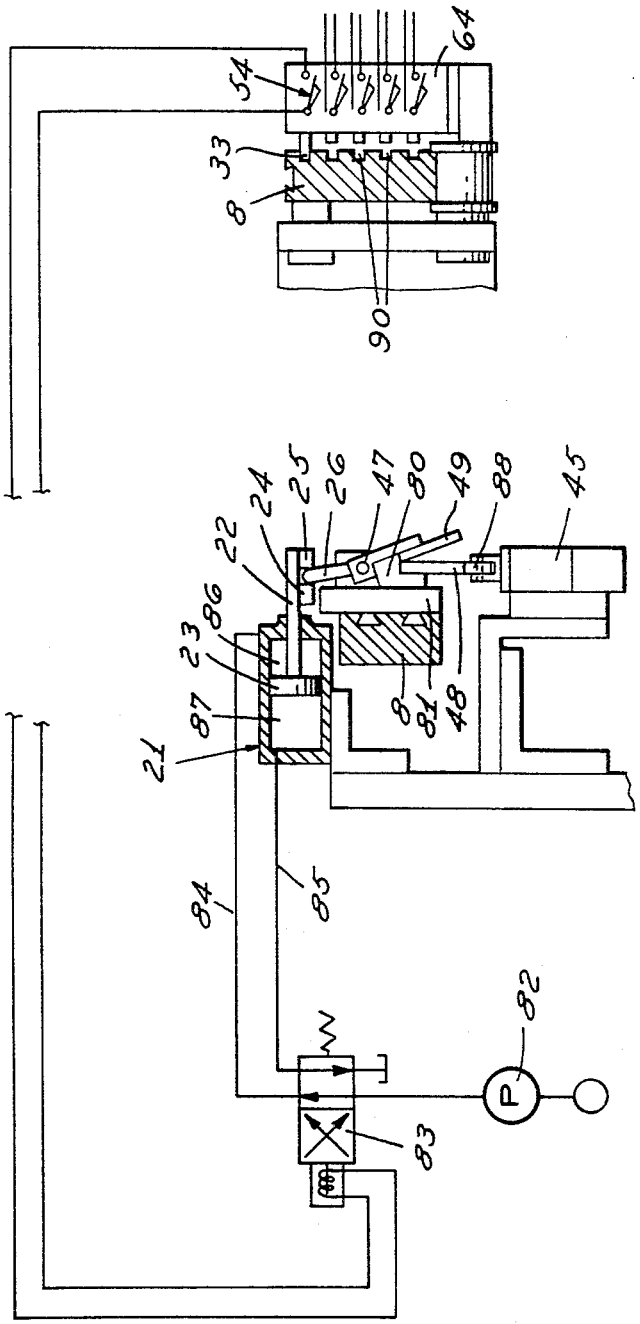

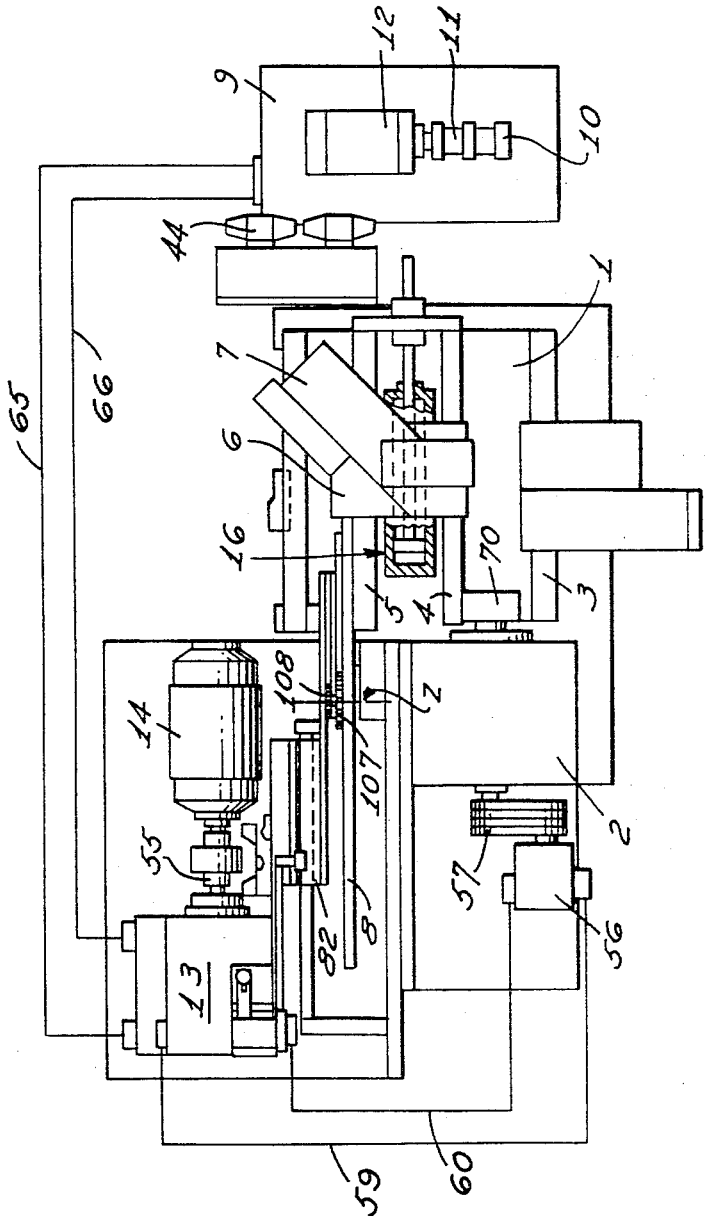

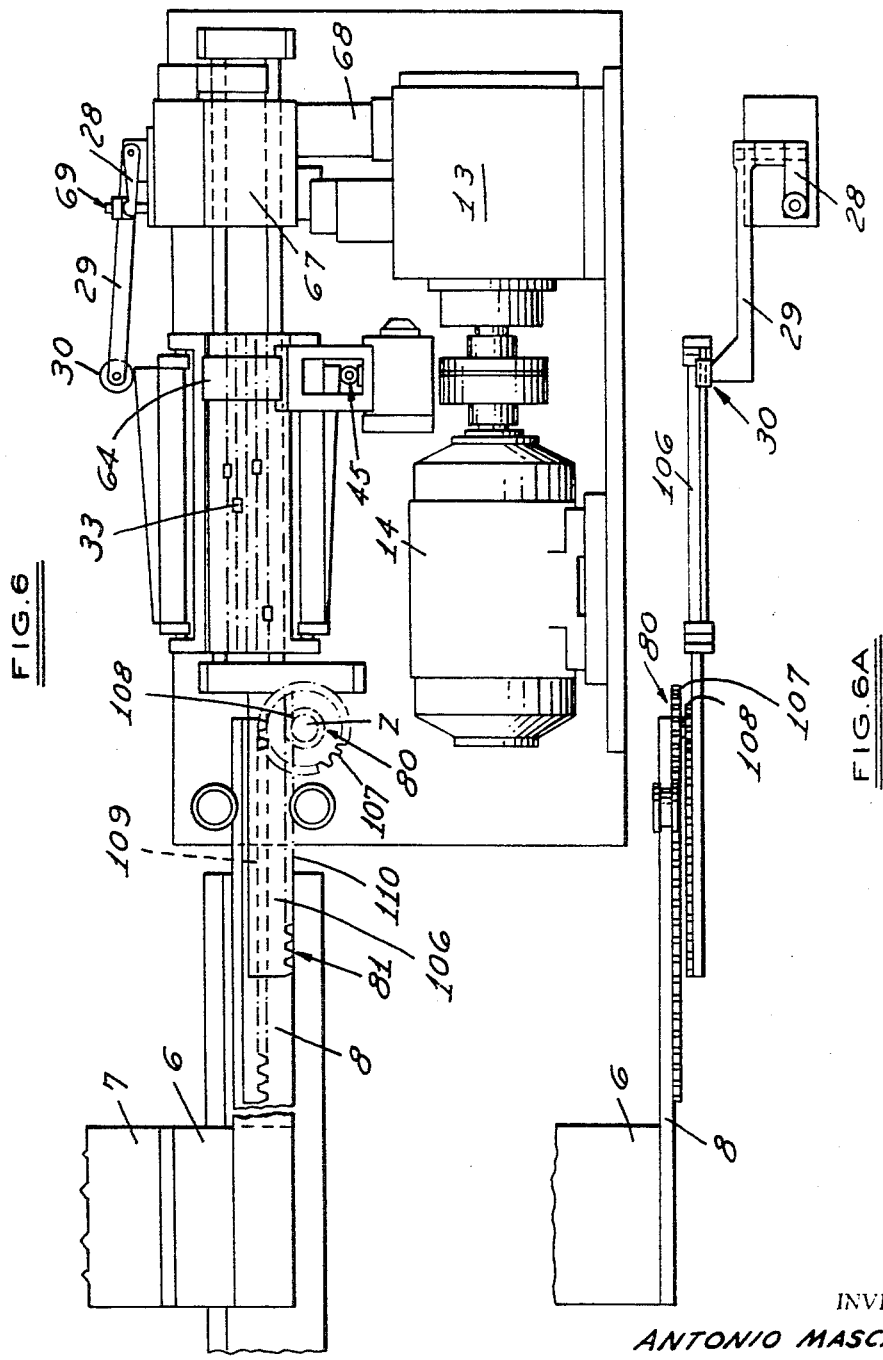

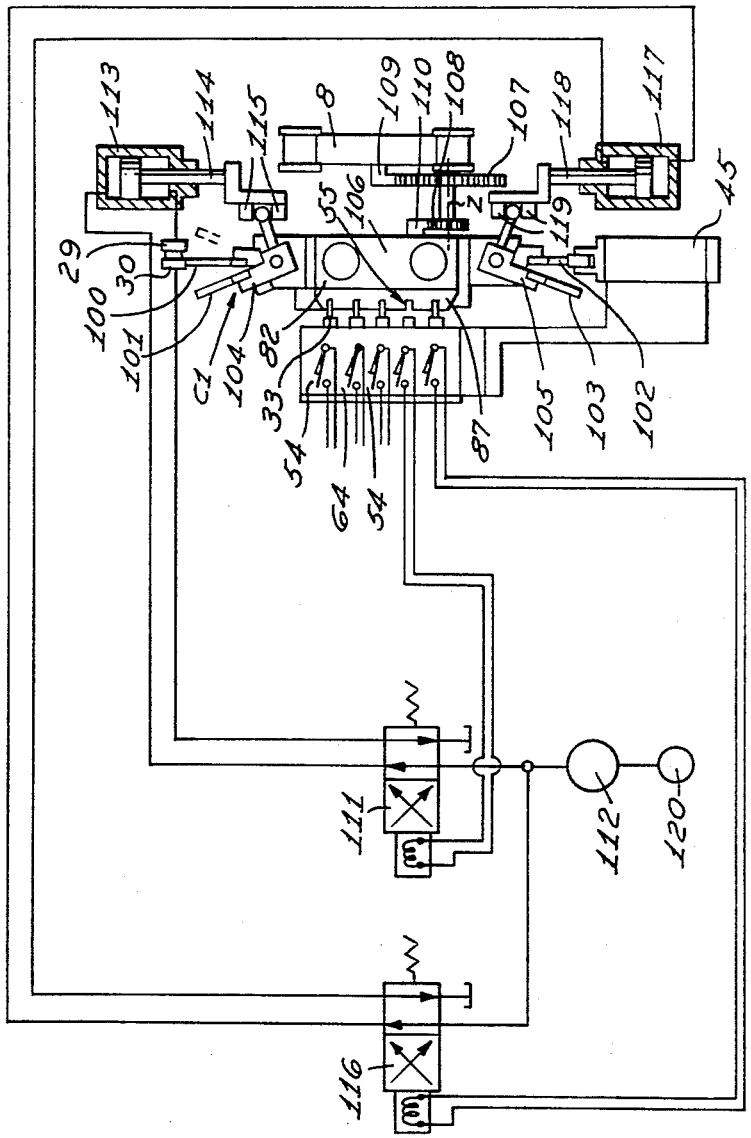

United States Patent Office 3,473,424
Patented Oct. 21, 1969

3,473,424
HYDRODYNAMICALLY CONTROLLED COPYING LATHE WITH MEANS FOR AUTOMATICALLY VARYING THE SPEED OF THE TOOL CARRYING CARRIAGE AND THE SPINDLE
Antonio Mascherpa, Corso Republica 34–I, 28041 Arona Novara, Italy
Filed Sept. 13, 1967, Ser. No. 667,422
Int. Cl. B23b 3/28
U.S. Cl. 82—14
8 Claims

ABSTRACT OF THE DISCLOSURE

A hydrodynamically controlled copying lathe, having means for automatically varying the speed of the tool-carrying carriage and the spindle.

In a turning operation, in order that an ideally correct machining might be obtained, the speed of the workpiece should be continually adjusted to the turning diameter, and the speed of advance should be adapted to the cross-sectional area of the shaving to be removed. By doing so, the maximum power of the machine can be exploited at every instant of the time and high coefficients of the machine output and tool life can be attained.

This requirement is of special importance in copying or duplicating lathes in which the profile to be obtained is a function of the outline of a template. Speed variations are frequently adopted for lathes, and there are two, three, four or more preselected speeds of rotation of the spindle which carries the workpiece, said speeds being automatically interchangeable during progress of turning. The feed movement is provided with two, three or four speeds, which are automatically interchangeable.

In an embodiment of the inventive device, a movable bar is mounted on the tool-carrying carriage and has cams or like members adapted to control the driving members for said carriage and the rotating spindle, the action exerted by said cams through said members being such as to vary the feed speed of the carriage and the rotational speed of the spindle according to a law defined by the outline of said cams.

The accompanying drawings are diagrammatical showings of a few exemplary embodiments of the inventive machine. More particularly:

FIG. 1 is a plan view of the machine;
FIG. 2 is a rear elevational view of the same machine;
FIG. 2A is a plan view of the cam and driving members;
FIG. 3 is a schematic illustration of a device for controlling the tool-carrying carriage;
FIGS. 4A and 4B shows a device for controlling the speed of the carriage;
FIG. 5 is a plan view of another machine which incorporates a few changes with respect to the preceding machine;
FIG. 6 is an elevational view of the machine of FIG. 5;
FIG. 6A shows a plan view of the cam and cam followers;
FIG. 7 shows a device for controlling the carriage and the spindle of said machine of FIG. 5.

The machine shown in FIGS. 1, 2, 3 and 4, is a duplicating lathe, which comprises a base of fixed framing 1 and carrying ways, shown at 3, 4, 5 affixed to the base 1.

The numeral 2 indicates the head and 70 indicates the spindle, that is, the rotating member which supports the workpiece. A indicates the rotation axis or geometrical axis of rotation of the spindle, said ideal axis being in fixed position with respect to the base.

The numeral 6 indicates a longitudinally displaceable carriage, adapted to carry the tool for machining the workpiece. The carriage 6, guided by the ways 4 and 5 can be moved in either direction along the axis A.

The reference numeral 7 indicates the copying assembly or duplicating slide carried by the carriage 6 and movable thereon. On the device 7 a template 71 adjustably affixed to a template holder 72 fixed with respect to the base 1. The device 7 and the template 71 are not, as themselves, a part of the present invention.

To activate the carriage 6 a hydraulic driving system is provided, comprising a cylinder 16 mounted on the carriage 6, so as to form an integral part thereof. The cylinder 16 houses the head 73 of a piston assembly 17 which divides the interior of the cylinder into two chambers 74 and 75 as shown in FIG. 3. Through the stem of said piston assembly two longitudinal bores 76 and 77 are formed which communicate with the chambers 74 and 75, respectively. The stem of piston is integrally connected with a supporting member 18 which, in turn, is integrally connected with the base 1.

The numerals 10 and 11 indicate two pumps having a fixed rate of flow and which are mounted on the base 1 and are both actuated by an electric motor 12, also mounted on the bed, said pumps being furnished with oil from tank 9.

The pump 10 furnishes oil to the hydraulic circuit for copying control, in a conventional manner, which is not a part of the present invention. The pump 11, conversely, is intended for supplying oil to the cylinder 16. More particularly, the pump is connected, via a magnetic valve 44, to two conduits 78, 79 branched off from valve 44 and leading to the longitudinal bores 76 and 77 in the stem of piston assembly 17. The conduit 78 is in communication with the bore 76 via a valve 45 adapted to vary the oil flow towards the chamber 74 of the cylinder 16. Means are provided, to be described hereinafter, to act upon the valve 45 so as to bring about said variation of the rate of flow. The magnetic valve 44 is adapted to allow oil to pass through the conduit 78 or, as an alternative, through the conduit 79, means being provided, as will be described later, for controlling magnetic valve 44.

A relative axial movement is possible between the cylinder 16 and the piston assembly 17; now, inasmuch as the piston assembly 17 is integral with the base 1 of the machine, whereas the cylinder 16 is integral with the carriage 6 which is movable, it is apparent that, by feeding pressurized oil into the chamber 74, or the chamber 75, the carriage 6 is displaced. When the magnetic valve 44 causes oil to pass into the conduit 78, the oil, through the bore 76, reaches the chamber 74, so that the carriage 6 is displaced in the sense of the arrow F1, see FIG. 3. When, contrarywise, said magnetic valve causes oil to pass through the conduit 79, the oil, via the bore 77, reaches the chamber 75 so that the carriage 6 is displaced in a direction opposite to that of the arrow F1.

To accurate the spindle 70 there is provided a hydraulic motor 56, mounted on the machine base. The numeral 57 indicates the spindle sheave which is connected, via belts, to the motor 56.

A variable-flow pump 13, mounted on the bed, is connected to the oil tank 9 by conduits 65, 66. The pump 13, is connected to the motor 56 by conduits 59, 60 and provides oil to motor 56 for actuating the spindle 70. An electric motor 14, mounted on the base is connected, through a joint or coupling 15, to the pump 13 so as to rotate said pump. Thus, as the motor 14 rotates the variable flow pump 13, the oil is drawn from the tank 9 and to the hydraulic motor 56. Motor 56 actuated in this manner, drives the spindle 70 which thus rotates about its own geometrical axis A.

To vary the speed of displacement of the carriage 6 means are provided to act upon the valve 45 so as to vary the rate of flow of oil which is sent to the chamber 74 of the cylinder 16.

To vary the rotational speed of the spindle 70 means are provided to act upon the variable flow pump 13 so as to vary the rate of flow of said pump and thus the speed of the hydraulic motor 56 which actuates the spindle 70.

The means for varying the feed speed of the carriage 6 and the rotational speed of the spindle 70 comprises a metal bar 8 having a rectangular cross-sectional shape and mounted on the carriage 6, said bar including means for providing a series of actions, as will be explained hereinafter, on the valve 45 and the pump 13.

More particularly, the bar 8 supports two templates, 48 and 49, each of which, having a preselected outline, is adapted to act upon the valve 45. To this purpose, the valve 45 has a moveable plunger carrying a follower 88 intended to contact, consistently with the stages of a cycle, the surface of the template 49.

The templates 48 and 49 are both keyed to a template carrier 80 pivotally connected at 47, to a supporting member 81 which is affixed to the bar 8. The numeral 21 indicates a hydraulic cylinder affixed to the base. Within the body of the cylinder 21 the head 23 of the piston 22 is slidable carrying two followers 24 and 25 spaced a certain distance apart from one another. Between said followers is freely located a leg 26 integral with the template carrier 80, so that the axial displacements of the piston 22 give rise to angular movements of the template carrier 80, which is displaced because of the templates 48 and 49. The head 23 of the piston 22 divides the interior of the cylinder 21 into two chambers 86 and 87. A pump 82 mounted on the base, forces oil to the cylinder 21 through a magnetic valve 83. From this valve, similar to the magnetic valve 44, branch off two conduits 84 and 85 communicating with the chambers 86 and 87, respectively, of the cylinder 21.

Said magnetic valve, coincident with the stage of a cycle, directs oil to either conduit 84 or 85. If the oil, for example, comes into the chamber 86 of the cylinder 21, the oil shifts the piston 22 in a direction towards the left as viewed in FIG. 4A, thus rotationally displacing the leg 26. That is, the template holder is moved in the direction in which the template 48 is brought into operative position (said operative position is the one shown in FIG. 4A). When, conversely, the oil comes into the chamber 87, the piston 22 is displaced by the oil in the opposite direction, thus bringing the template 49 in the operative position.

As a matter of fact, the template holder 80, by rotating in a direction or in the opposite one through an angle which is equal to the angle encompassed by the two templates 48 and 49, can be shifted from one position to the other (and vice versa) of two equilibrium positions in which the template 48 and the template 49 are in the operative position, respectively. Obviously, when either template is in the operative position, for example, the template 48, as shown in FIG. 4A, the other template remains inoperative.

The term operative position of a template, is intended herein to mean the position in which the surface of the template contacts, during the movement of the carriage in which the bar 8 contacts the follower 88 of the valve 45.

The variations of the rate of flow of the pump 13 are obtained through a servomechanism which is well known and is not a part of the present invention and whose parts are shown at 67 and 68 in FIG. 2 and upon which means are provided according to this invention which will be described below.

The means referred to above comprises a template 31 affixed to a template holder 32 affixed to the bar 8, and a lever 29 pivoted to a supporting member fastened to the base. The template 31 is adapted to act upon a follower 30 carrier by the lever 29, thus giving rise to angular shifts of said lever.

A lever 28 is affixed to the lever 29 whose length is less than that of lever 29 so that the end of lever 29 goes through a patch which, linearly, is less than that traveled by the end of the lever 29.

The lever 28 is adapted to act upon a plunger 89 which belongs to the servo system 67–68. By actuating the plunged 89 via the lever 28, variations of the rate of flow of the pump 13 are brought about through the servo system 67–68.

The bar 8 carries a set of dogs 33 affixed thereto and adjustable in predetermined positions. More particularly, the bar 8 has parallel rectilinear grooves 90 oriented in the direction of movement of the bar in which dogs 33 are fastened. The dogs 33 are adapted to act upon microswitches 54 carried by a box 64 affixed to the base so as to determine certain preselected control actions. More particularly, by acting on microswitches 54, the magnetic valves 44 and 83 are acted upon in the desired instants of time so as to bring about displacements of the cylinder 6 and the template holder 80 in the desired directions.

With the system of microswitches 54 actuated by the dogs 33, other controls are also effected such as, for example, actuations of other slides, stoppage of the carriage 6 at the end of its stroke, etc.

Summing up, when the machine is operational, that is, the spindle 70 is rotating about its axis A and the carriage is advanced along the direction of said axis A, the advance of the carriage brings about variations of the rotational speed of the carriage.

More particularly, assuming that, upon the movement of a dog 33 which acts upon a microswitch 54, the magnetic valve 54 transmits oil through the valve 45, into the chamber 74 of the cylinder 16, the flow through said valve 45 is varied by the action exerted on said valve 45 by a template, for example, the template 48, so that the advance speed of the carriage is varied, it being obvious that the reason for the speed to vary is a function of the template outline. If desired, provisions can be taken so that, at a certain stage of the cycle, a dog 33 may act upon a microswitch 54 for determining an action on the magnetic valve 83. Thus through the piston 21, the supporting member 80, which carries the templates 48 and 49 is angularly shifted. Thus, the other template 49 moves into position and causes the speed of the carriage 6 to be varied.

The template 31, in turn, which is mounted to the bar 8, by movement of the lever 29 causing it to pivot so that the lever 28, integral with the lever 29, acts upon the servo system 67, 68 by varying the rate of flow of the pump 13 (actuated by the motor 14) and thus varies, according to the outline of the template 31, the rotational speed of the spindle 70.

It is obvious that the several templates, or cams, carried by the bar 8 and which define, with their outlines, the variation of the speed of the carriage 6 and the rotational speed of the spindle 70, can be replaced by other templates so as to change the speed consistent with the production requirements.

In the alternative embodiment shown in FIGS. 5, 6 and 7, a few further improvements are provided for, particularly for those cases in which it is required that the carriage which carries the duplicating slide 7, makes two or more sequential passes for machining the workpiece, as a result of a considerable amount of stock to be removed.

In the case, of, for example, two passes, the speed of rotation of the workpiece in the first roughening pass will have a variation which is different from the variation of the speed which is more suitable for the finishing pass. As a matter of fact, in the second pass, the workpiece, inasmuch as it is more regular as to its shape and deprived of dross and burrs due to stamping and forging, can be machined at a much higher speed than during the first roughening pass.

The valves of the feed for the carriage 6 can be varied for the same reasons enumerated above. As a matter of fact, in the first pass, the feed speed of the carriage is proportional to the amount of removable stock, the performance of the cutting tool and the power of the machine. Furthermore, in the vicinity of a shoulder, the advance speed is decreased as a function of the removable stock being left after the forging and stamping operations.

In the second, or finishing passage, the removable stock is of a more regular diameter and is more even on the shoulders so that the feeding speed can be varied as a function of the degree of finishing required for the several diameters.

The machine shown in FIGS. 5, 6 and 7 provides, when two or more passes are to be made on a single workpiece, for continually varying the speed of the spindle, as well as the continual variation of the feed of the carriage 6.

The machine includes several features shown in FIGS. 1–4 and includes essentially the same operability, said parts being connected by the same reference numerals.

To vary the rate of flow of the pump 13, two templates 100 and 101 are used, each of which is adapted to act upon the lever 29 which, in turn, is active on the servo system 67, 68 for varying the rate of flow of the pump 13, so that the outline of each template is such as to define a different variation for the rotational speed of the spindle 70.

The numerals 102 and 103 connote two templates, similar to the templates 48 and 49 of the previous example, and adapted to act upon the valve 45 so as to vary, with two discrete different changes of the speed of the carriage 6. The templates 100, 101 are carried by a holder 104, and the templates 102, 103 are carried by a holder 105. The template holders 104 and 105 are not carried by the bar 8 but are pivotally mounted on another bar, shown in FIG. 7 at 106, which is supported and guided so as to make rectilinear movements in the same direction as that of the bar 8, that is, in the direction of feed of the carriage 6. The numerals 107 and 108 indicate two gears of different diameters, integral with one another, and carried by the frame so as to be rotated about their common geometrical axis Z which is in fixed position with respect to the machine base. The bar 8, integral with the carriage 6 carries a rack 109 meshing with the gear 107, whereas the bar 106 carries a rack 110 meshing with the gear 108; so that as the carriage 6 is being moved, it transfers, via said racks and gears, the drive to the bar 106 with a speed ratio which is defined by the diameter ratio of said gears. In the case in point, the diameter of the gear 107 is twice that of the gear 108 so that the bar 106 is moved at a speed which is one half of that of the bar 8, that is, of the carriage 6.

Such a speed-reducing system allows to have, for different length of the lathe bed, and thus for different strokes of the carriage 6, still the same stroke for the bar 106. It is well within the purview of a person skilled in the arts to change the gears 107 and 108 to accommodate different size workpieces.

The device for actuating the template holder 104, so as to bring it to either of the two positions of operability, that is, to bring in operative position either template 100 or 101, is very much the same as described above for the templates 48 and 49. This includes a magnetic valve 111 connected to two chambers in the interior of the fixed cylinder 113 whose movable piston 114, actuated in either direction (according to whether the magnetic valve 111 sends oil to either of said chambers), gives rise to a displacement, on either direction, of a pair of followers 115 which, in turn, displace said template holder 104. Very similar to the foregoing, is also the device for displacing the template holder 105, comprising a magnetic valve 116, connected to the two chambers of a fixed cylinder 117 whose movable piston 118 is adapted to actuate, through a pair of followers 119, said templateholder 105, so as to bring into operative position either template 102 or 103. The oil for actuating the pistons 114 and 118 is fed into the magnetic valves 111 and 116 and thus to the cylinders 113 and 117 by a pump 112 connected to a tank 120.

The control of the magnetic valves 111 and 116 takes place, as in the previous example, by the instrumentality of dogs 33, carried by the bar 106 and acting upon microswitches 54 carried by a box 64 fastened to the machine base.

During a preliminary stage of the machining of the workpiece carried by the spindle 70, that is, the first pass; the speed of rotation of said spindle is varied according to the outline of a template, e.g., the template 100, which being in its operative position, acts upon the lever 29 so that the lever 28, in turn is active on the servo system 67, 68 and causes the rate of flow of the pump to be varied. In the same first stage, the variation of the speed of the carriage 6 is carried out according to the outline of a template, e.g. the template 102, which being in the operative position, acts upon the valve 45, by varying the rate of flow of the oil sent to the cylinder 16 as in the previous example. In the second stage of machining, or second pass, the templates 101 and 103 are operative and these are brought in an operative position by controls of the dogs 33 which, acting on microswitches 54, give rise to an action of the magnetic valves 111 and 116 so as to invert the stroke of the pistons 114 and 118. Thus, during said second stage, the variation of the speeds of the spindle 70 and the carriage 6 are determined by the outlines of the templates 101 and 103, respectively.

If desired the templates which define the variation of the speeds of the carriage and the spindle can be changed and thus, also, the dog-carrying plate to be affixed to the bar 8, or, alternatively, the bar 106, can be changed. A number of dog-carrying plates, with the dogs prearranged thereon can be held in stock and it is possible to pass from one stage to another by merely changing the position of the dogs on the same plate.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention.

What is claimed is:

1. A turning machine, more particularly a hydrodynamically controlled duplicating lathe, characterized in that it comprises means which are actuated by the tool-carrying carriage and adapted to act upon the motor means which drive said carriage and the rotating spindle, so as automatically to vary the feed speed of said carriage and the rotational speed of said spindle, and a movable bar, actuated by the tool-carrying carriage, carrying templates adapted to act upon members which, in turn, are active on the driving members which actuate said carriage and said rotating spindle, so that a variation is automatically obtained of the feed speed of said carriage and the speed of the spindle, according to the outlines of said templates, the latter being interchangeable.

2. A turning machine according to claim 1, characterized in that, for the variations of the speed of the carriage, and for the variations of the speed of the spindle, there are respectively provided, two pairs of templates, each of said pairs being connected to said bar so as to vary the position of the templates with respect to said bar, thus being enabled to position either template in the operative position, means being provided for each pair of templates, which means are actuated by members carried by said bar, adapted to actuate said templates so as to carry either template into its operative position at the desired instant of time.

3. A turning machine according to claim 22, characterized in that, for each pair of templates, an hydraulic cylinder is provided whose piston, being moved in one direction or in the opposite direction, brings into operative position either template, a pair of two-way magnetic valves being provided, which receives oil from a pump connected to a tank and adapted to feed oil to either chamber in the interior of each of said hydraulic cylinders, said chambers being separated from one another by the piston head, so as to give rise to the displacement of said piston in either direction, said pair of magnetic valves, comprising one for actuating the said two pairs of templates provided therefor, and the other for varying the carriage speed and the spindle speed, respectively being actuated by microswitches which are actuated, in turn, by dogs carried by said bar.

4. A turning machine according to claim 1, characterized in that said tool-carrying carriage is actuated by means of a hydraulic cylinder adapted to displace said carriage in one direction or in the opposite direction according to whether the oil is sent to either of two chambers of the cylinder, said chambers separated from one another by the head of the piston of said cylinder, a two-way magnetic valve being provided, which receives oil from a pump connected to a tank and adapted to send oil to either of said chamber in said cylinder, a dog being provided, carried by said bar, and adapted to act upon a microswitch for controlling said magnetic valve, another valve being provided, inserted in a hydraulic circuitry connecting said magnetic valve to either chamber of said cylinder, which valve, actuated by a template carried by said bar, gives rise to a variation of the rate of flow of the oil sent to said chamber of said cylinder.

5. A turning machine according to claim 1, characterized in that, for each revolution of the spindle a hydraulic mover is provided, actuated by a variable rate of flow pump connected to a tank, said pump being actuated by an electric motor, the variations of the rate of flow of said pump being obtained by the outline of a template carried by said bar.

6. A turning machine according to claim 1, characterized in that said template-carrying bar is integral with said tool-carrying carriage.

7. A turning machine according to claim 1, characterized in that said template-carrying bar is actuated, via a speed-reducing gear system, by a bar integral with said tool-carrying carriage.

8. A tool-carrying machine according to claim 1, characterized in that said template-carrying bar carries a set of dogs adapted to act upon microswitches so as to originate various controls for the operative cycle of the machine.

References Cited
UNITED STATES PATENTS

| | | | |
|---|---|---|---|
| 2,459,902 | 1/1949 | Tucker | 82—21 |
| 3,143,900 | 8/1964 | Oeckl et al. | 77—67 |
| 3,203,017 | 8/1965 | Holzl | 77—25 |
| 3,211,978 | 10/1965 | Cottin | 82—21 |

GERALD A. DOST, Primary Examiner

U.S. Cl. X.R.

82—21